(12) United States Patent
Nishida

(10) Patent No.: US 10,997,617 B2
(45) Date of Patent: May 4, 2021

(54) INFORMATION PROCESSING SYSTEM TO DETERMINE AN OPTIMAL NUMBER OF VIRTUAL SERVERS

(71) Applicant: Takayori Nishida, Kanagawa (JP)

(72) Inventor: Takayori Nishida, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 185 days.

(21) Appl. No.: 16/355,761

(22) Filed: Mar. 17, 2019

(65) Prior Publication Data

US 2019/0303956 A1 Oct. 3, 2019

(30) Foreign Application Priority Data

Mar. 28, 2018 (JP) .............................. JP2018-063046

(51) Int. Cl.

| G06Q 30/02 | (2012.01) |
|---|---|
| G06Q 30/06 | (2012.01) |
| G06F 8/61 | (2018.01) |
| G06F 9/455 | (2018.01) |

(52) U.S. Cl.
CPC ........... *G06Q 30/0206* (2013.01); *G06F 8/61* (2013.01); *G06F 9/45558* (2013.01); *G06Q 30/0641* (2013.01); *G06F 2009/45595* (2013.01)

(58) Field of Classification Search
CPC ............ G06Q 10/00–50/00; G06F 1/00–40/00
USPC ................................. 705/7.11–7.42
See application file for complete search history.

(56) References Cited

U.S. PATENT DOCUMENTS

| 7,523,172 | B2* | 4/2009 | Mouhanna | .......... H04L 41/0803 709/217 |
|---|---|---|---|---|
| 8,467,312 | B2* | 6/2013 | Raleigh | .................... H04W 4/20 370/252 |
| 8,639,595 | B1* | 1/2014 | Brooker | .................. G06Q 20/14 705/30 |
| 8,924,561 | B2* | 12/2014 | Brown | .................. G06F 9/5072 709/226 |
| 9,300,539 | B2* | 3/2016 | DeJana | .................. G06F 9/5072 |
| 9,336,030 | B1* | 5/2016 | Marr | ...................... G06F 9/5077 |
| 9,747,125 | B2* | 8/2017 | Husain | ................ G06F 9/45558 |
| 9,998,434 | B2* | 6/2018 | Verzun | .................. H04L 9/0662 |
| 10,326,649 | B2* | 6/2019 | Steinder | .................. G06N 7/005 |
| 2005/0256952 | A1* | 11/2005 | Mouhanna | .............. H04L 41/12 709/223 |
| 2008/0201711 | A1* | 8/2008 | Amir Husain | .......... G06F 9/445 718/1 |

(Continued)

FOREIGN PATENT DOCUMENTS

| JP | 2001-036673 | 2/2001 |
|---|---|---|
| JP | 2003-162397 | 6/2003 |
| JP | 2017-027273 | 2/2017 |

*Primary Examiner* — Alan S Miller
(74) *Attorney, Agent, or Firm* — Oblon, McClelland, Maier & Neustadt, L.L.P.

(57) ABSTRACT

An information processing system, apparatus and method are provided. The information processing system receives input of a service scale of a user service from a terminal device, determines a charge plan, performance, and optimum number of virtual servers for providing the user service with a usage amount and number of devices included in the service scale that is received, by referring to a table in which the performance and the charge plan of the virtual server are associated with each other, and displays information including the charge plan and the number of virtual servers that are determined.

12 Claims, 10 Drawing Sheets

(56) References Cited

U.S. PATENT DOCUMENTS

| | | | |
|---|---|---|---|
| 2009/0276771 A1* | 11/2009 | Nickolov | H04L 67/1014 717/177 |
| 2010/0051681 A1 | 3/2010 | Nishida | |
| 2011/0063667 A1 | 3/2011 | Nishida | |
| 2011/0219372 A1* | 9/2011 | Agrawal | H04L 67/06 718/1 |
| 2011/0273738 A1 | 11/2011 | Tanaka et al. | |
| 2012/0084443 A1* | 4/2012 | Theimer | G06F 9/45533 709/226 |
| 2012/0195222 A1* | 8/2012 | Raleigh | H04L 63/0892 370/252 |
| 2012/0239792 A1* | 9/2012 | Banerjee | H04L 67/1097 709/223 |
| 2013/0014112 A1 | 1/2013 | Nishida | |
| 2013/0036217 A1* | 2/2013 | DeJana | H04L 41/12 709/224 |
| 2013/0141752 A1 | 6/2013 | Nishida | |
| 2013/0194612 A1 | 8/2013 | Nishida | |
| 2013/0329245 A1 | 12/2013 | Nishida | |
| 2014/0055809 A1 | 2/2014 | Nishida | |
| 2014/0337445 A1 | 11/2014 | Nishida | |
| 2014/0366104 A1 | 12/2014 | Nishida et al. | |
| 2015/0022846 A1 | 1/2015 | Nishida | |
| 2015/0022847 A1 | 1/2015 | Nishida | |
| 2015/0026340 A1 | 1/2015 | Nishida | |
| 2015/0026782 A1 | 1/2015 | Nishida | |
| 2015/0029534 A1 | 1/2015 | Nishida et al. | |
| 2015/0033293 A1 | 1/2015 | Nishida et al. | |
| 2015/0082320 A1 | 3/2015 | Hori et al. | |
| 2015/0163163 A1* | 6/2015 | Kato | H04L 67/34 709/226 |
| 2015/0178024 A1 | 6/2015 | Nishida | |
| 2015/0229586 A1* | 8/2015 | Jackson | G06Q 30/0269 705/40 |
| 2016/0070511 A1 | 3/2016 | Nishida | |
| 2016/0098233 A1 | 4/2016 | Nishida | |
| 2016/0196096 A1 | 7/2016 | Nishida et al. | |
| 2017/0372384 A1* | 12/2017 | Yaros | H04L 67/10 |
| 2018/0203655 A1 | 7/2018 | Nishida et al. | |
| 2018/0285794 A1* | 10/2018 | Gray-Donald | G06F 9/5038 |

* cited by examiner

FIG. 6

| CHARGE PLAN | CPU | MEMORY | NUMBER OF JOBS | NUMBER OF DEVICES | CHARGE |
|---|---|---|---|---|---|
| Minimum | 1 core | 16 GB | 500 | 1000 | $1,000 |
| Basic | 2 core | 16 GB | 1000 | 5000 | $1,500 |
| High | 4 core | 32 GB | 5000 | 7500 | $3,000 |
| Super High | 8 core | 32 GB | 10000 | 10000 | $5,000 |

1000 — CHARGE PLAN INFORMATION

FIG. 7

| DATA CENTER | LOCATION | COUNTRY |
|---|---|---|
| US East | ... | USA |
| US West | ... | USA |
| England | ... | ENGLAND |
| Germany | ... | GERMANY |
| Japan East | ... | JAPAN |
| Japan West | ... | JAPAN |
| ... | ... | ... |

2000 — DATA CENTER INFORMATION

| COUNTRY | FOREIGN SERVER USE PERMISSION FLAG |
|---|---|
| USA | YES |
| ENGLAND | YES |
| GERMANY | NO |
| JAPAN | YES |
| ... | ... |

⎬ FOREIGN SERVER USE PERMISSION INFORMATION

| CUSTOMER ID | VIRTUAL SERVER | DATA CENTER | NUMBER OF MARGINAL JOBS | NUMBER OF MARGINAL DEVICES |
|---|---|---|---|---|
| CUSTOMER 1 | DEVICE MANAGEMENT SERVER 1 | US West | ... | ... |
| | DEVICE MANAGEMENT SERVER 2 | US West | ... | ... |
| | DEVICE MANAGEMENT SERVER 3 | US East | ... | ... |
| | ... | ... | ... | ... |
| CUSTOMER 2 | ... | ... | ... | ... |
| ... | ... | ... | ... | ... |

⎬ EXISTING SERVER INFORMATION

FIG. 13

SERVICE ENVIRONMENT PLANNING

Service environment will be built as follows.

| Site | Data Center | Minimum | Basic | High | Super High | Charge |
|---|---|---|---|---|---|---|
| New York | US East | – | – | 1 | 2 | $13,000 |
| Newark | | | | | | |
| Berlin | Germany | 1 | 1 | – | – | $2,500 |
| Tokyo | Japan East | 1 | – | – | – | $1,000 |
| | | | | | Total | $16,500 |

| Data Center | Number of Marginal Jobs | Number of Marginal Devices |
|---|---|---|
| US East | ... | ... |
| Germany | ... | ... |
| Japan East | ... | ... |
| Total | | |

Cancel    OK

INFORMATION PROCESSING SYSTEM TO DETERMINE AN OPTIMAL NUMBER OF VIRTUAL SERVERS

CROSS-REFERENCE TO RELATED APPLICATION

This patent application is based on and claims priority pursuant to 35 U.S.C. § 119(a) to Japanese Patent Application No. 2018-063046, filed on Mar. 28, 2018 in the Japan Patent Office, the entire disclosure of which is hereby incorporated by reference herein.

BACKGROUND

Technical Field

The present disclosure relates to an information processing system, apparatus, and method.

Background Art

In recent years, a service called Infrastructure as a Service (IaaS) that provides a virtual machine (VM) instance through a network such as the internet and the like has become available. In addition, it is also possible to install some software on the VM instance provided as IaaS and provide some cloud services (for example, a print service that makes the VM instance function as a print server).

A technology that can notify a subscriber to a telecommunications service in real time of an optimum subscription charge plan based on call charges (usage fee of the communication service) of the terminal and change the subscription charge plan to the optimum plan has also become available.

SUMMARY

Embodiments of the present disclosure described herein provide an information processing system, apparatus and method. The information processing system receives input of a service scale of a user service from a terminal device, determines a charge plan, performance, and optimum number of virtual servers for providing the user service with a usage amount and number of devices included in the service scale that is received, by referring to a table in which the performance and the charge plan of the virtual server are associated with each other, and displays information including the charge plan and the number of virtual servers that are determined.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 6 is a diagram illustrating an example of a charge plan information table;

FIG. 7 is a diagram illustrating an example of a data center information table;

FIG. 8 is a diagram illustrating an example of a foreign server use permission table;

FIG. 9 is a diagram illustrating an example of an existing server information table;

FIG. 13 is a diagram illustrating an example of an environment building plan screen.

Figure 1:
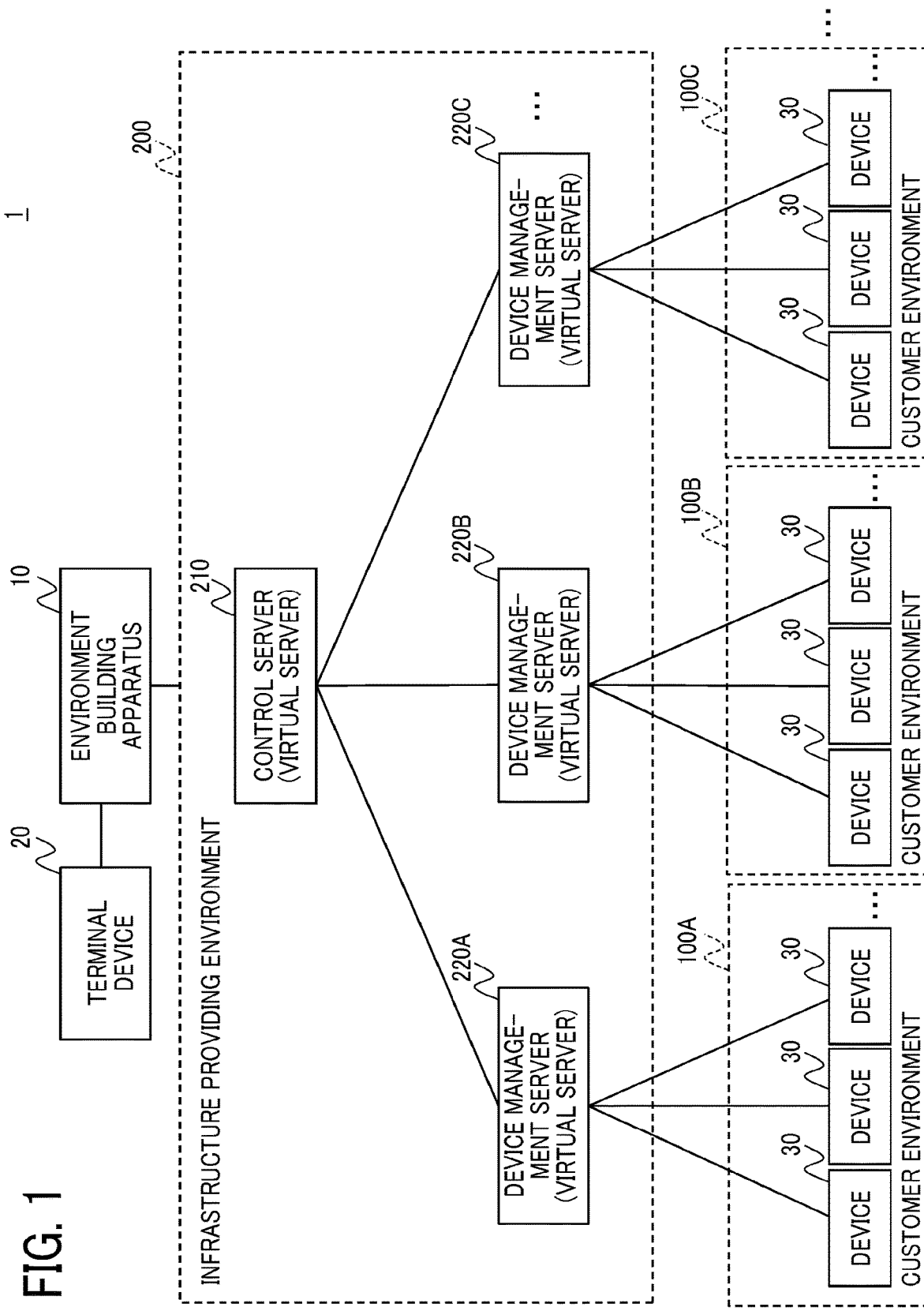
FIG. 1 is a diagram illustrating an overall configuration of a service environment building system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, a description is given of an embodiment of the present disclosure with reference to drawings. In the present embodiment, a service environment building system 1 that provisions a VM instance for providing a cloud service (hereinafter referred to as a "user service"), is described. Here, "to provision" means to build a VM instance on a physical machine.

The VM instance is simply referred to as a "VM" or "virtual machine". Also, a virtual machine aiming to function as a particular server (for example, print server etc.) is called a "virtual server". In the following description, it is assumed that the VM instance functions as a server and the VM instance is explained using the term "virtual server".

Overview of Configuration

Hereinafter, a description is given of an overall configuration of the service environment building system 1 according to the present embodiment with reference to FIG. 1. FIG. 1 is a diagram illustrating the overall configuration of the service environment building system 1 according to the present embodiment.

As illustrated in FIG. 1, the service environment building system 1 according to the present embodiment includes an environment building apparatus 10, a terminal device 20, and at least one device 30. Further, the environment building apparatus 10 and the terminal device 20 are communicably connected through a network such as the internet, for example. Furthermore, the environment building apparatus 10 and the device 30 are connected to an infrastructure providing environment 200 of a provider (infrastructure provider) that provides a virtual server as IaaS so as to enable the environment building apparatus 10 and the device 30 to communicate with each other through the network.

The environment building apparatus 10 calculates a scale of the user service (for example, installation location of the device 30, usage amount of the user service (usage amount per unit period), number of devices 30, etc.) input from the terminal device 20 and presents an optimum environment building plan of the virtual server to the user of the terminal device 20. Further, in response to a provisioning instruction for the environment building plan, the environment building apparatus 10 builds a control server 210 and one or more device management servers 220 (22A, 220B, 220C) as a virtual server in the infrastructure providing environment 200. In this way, an environment required for providing the user service is built.

When building a virtual server in the infrastructure providing environment 200, a charge is generated according to performance requirements and the number of virtual servers. Therefore, the environment building apparatus 10 according to the present embodiment presents to the user the optimum environment building plan that satisfies the performance requirements and the number of virtual servers necessary for the scale of the user service at the lowest charge. As a result, the user of the terminal device 20 can build the environment (service environment) necessary for using the user service based on the optimum performance and the number of virtual servers. In other words, the user of the terminal device 20 can obtain optimum sizing of the virtual server necessary for using the user service.

The terminal device 20 is a personal computer (PC) or the like used by a user who builds an environment necessary for using a user service. As the terminal device 20, for example, a smartphone, a tablet terminal, or the like may be used.

The device 30 may be any of various electronic devices that utilize the user service. Examples of the device 30 include an image forming apparatus such as a multifunction peripheral (MFP), a PC, and the like. The device 30 may be, for example, a printer, a scanner, an electronic whiteboard, a projector, a digital signage, a smartphone, a tablet terminal, or the like in addition to the image forming apparatus and the PC.

Here, the control server 210 and the device management server 220, which are built as a virtual server in the infrastructure providing environment 200, are necessary for the device 30 to use the user service. The control server 210 is built, for example, for each customer who owns the device 30 and manages one or more device management servers 220 built for the customer. Further, the device management server 220 is built, for example, for each customer environment 100 in which the device 30 is installed and manages the device 30 using the user service and implements the user service in cooperation with the device 30. Note that the customer is a company or organization (hereinafter referred to as a "company") who uses or wishes to use the user service.

For example, assume that customer environment 100A, customer environment 100B, and customer environment 100C exist as customer environment 100 of a customer. For example, the customer environment 100A is a system environment at New York head office, the customer environment 100B is a system environment at Newark branch office, the customer environment 100C is a system environment at San Francisco branch office, and the like. In this case, for example, a device management server 220A that manages the device 30 installed in the customer environment 100A, a device management server 220B that manages the device 30 installed in the customer environment 100B, and a device management server 220C that manages the device 30 installed in the customer environment 100C are built in the infrastructure providing environment 200. In this manner, for each customer environment 100, a device management server 220 that manages the devices 30 installed in the customer environment 100 is built.

However, in a case in which a plurality of customer environments 100 are geographically close, a single device management server 220 that manages the devices 30 installed in each of the plurality of customer environments 100 may be built. For example, one device management server 220 that manages the device 30 installed in the customer environment 100A which is the system environment of the New York head office and the device 30 installed in the customer environment 100B which is the system environment of the Newark branch office may be built.

Hereinafter, the geographical location (for example, state, prefecture, city, town, village, etc.) of the customer environment 100 where the device 30 is installed is referred to as "site". For example, when the customer environment 100A is the system environment at the New York head office, the site of the customer environment 100A is "New York".

Here, as a specific example of the user service, "print service" is described in which the device management server 220 is made to function as a server for accumulating print jobs. In this case, for example, a print job created by the device 30 which is a PC, or the like is accumulated in the device management server 220. Then, the device 30, which is an image forming apparatus, a printing device, or the like, acquires a print job from the device management server 220 and executes the print job, thereby performing printing. As a result, the print service is provided to the user of the device 30 that is the PC or the like.

Another specific example of the user service is a "scan distribution service" in which the device management server 220 functions as a server for distributing a scanned image to a certain destination. In this case, for example, the scanned image created by the device 30, which is an image forming apparatus, a scanner, or the like, is transmitted to the device management server 220. Then, the device management server 220 distributes the scanned image to the destination. As a result, a scan distribution service is provided to the user of the device 30 which is the image forming apparatus, the scanner, or the like. In the scan distribution service, data processed by the device management server 220 such as optical character recognition (OCR) on the scanned image may be distributed to the destination.

In this manner, the user service is implemented by performing processing in cooperation between the device 30 and the device management server 220 that manages the device 30. Hereinafter, as an example, description is given assuming that the user service is "print service". When the user service is print service, a usage amount of the user service is, for example, number of print jobs. However, alternatively the usage amount of the user service may be, for example, usage time while the device 30 is using the user service.

The configuration of the service environment building system 1 illustrated in FIG. 1 is just an example, and alternatively other configurations may be used. For example, the environment building apparatus 10 and the terminal device 20 may be included in the customer environment 100. Further, the control server 210 may be unnecessary depending on content of the user service and how the user service is implemented. In this case, the environment building apparatus 10 need not build the control server 210 in the infrastructure providing environment 200.

Further, in the present embodiment, a service provider that provides the user service and an infrastructure provider that provides the virtual server through the infrastructure providing environment 200 are assumed to be different suppliers, but the service provider and the infrastructure provider may be a single supplier. Further, in building the virtual server, a contract (contract for building the virtual server) with the infrastructure provider may be signed by the customer or by the service provider that provides the user service.

Figure 2:
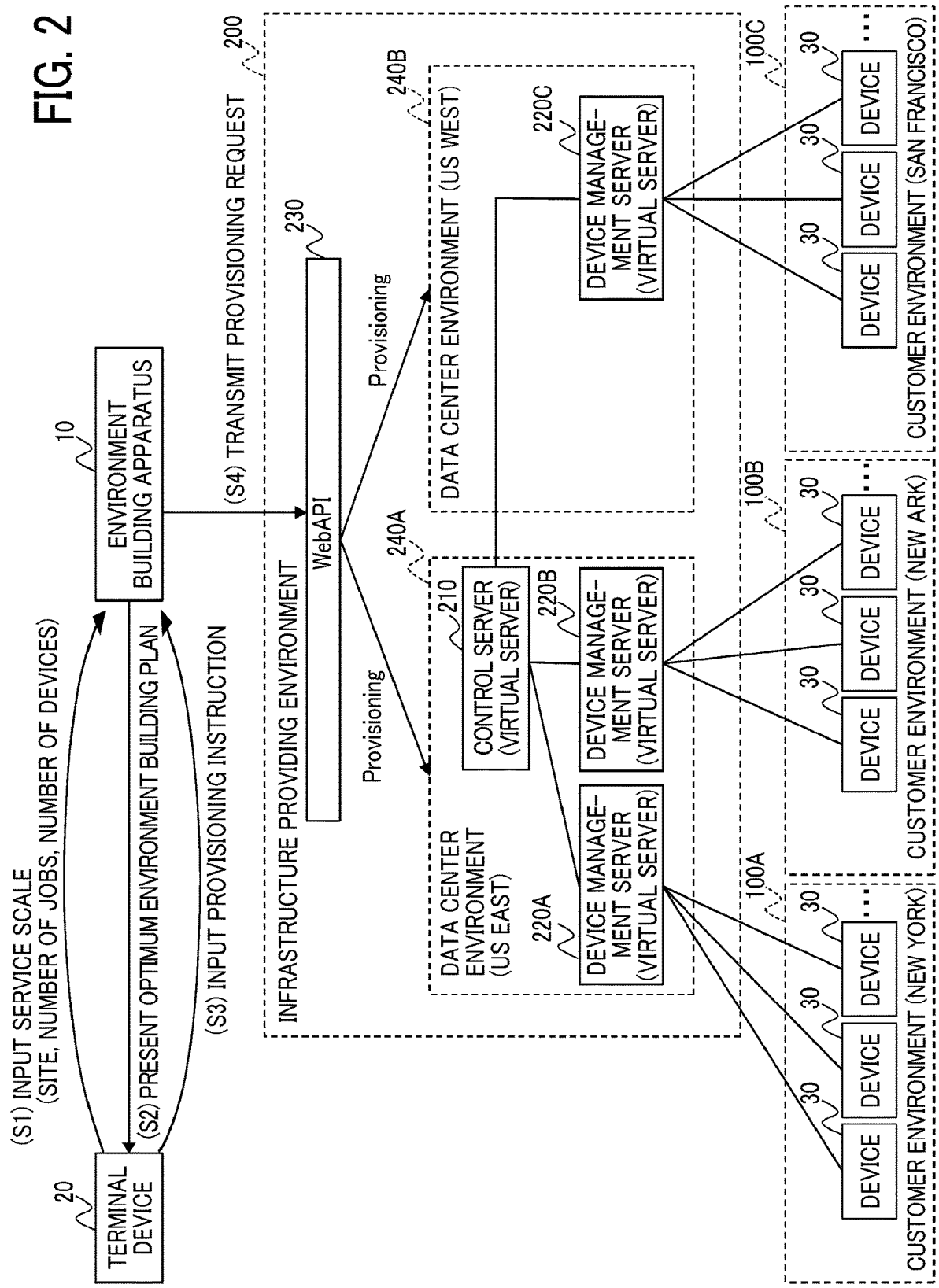
FIG. 2 is a diagram for explaining an overview of constructing a virtual server.

Construction of Virtual Server Here, with reference to FIG. 2, a description is given of a case in which the control server 210 and the device management server 220, which are virtual servers, are built in the infrastructure providing environment 200 by the environment building apparatus 10 according to the present embodiment. FIG. 2 is a diagram for explaining an overview of building a virtual server. By building the virtual server, an environment (service environment) necessary for using the user service is built.

In FIG. 2, it is assumed that the customer environment 100 includes New York's customer environment 100A, Newark's customer environment 100B, and San Francisco's customer environment 100C, and one device management server 220 is built for each customer environment 100.

(S1) When building a virtual server for utilizing a user service, the terminal device 20 inputs a scale of the user service to the environment building apparatus 10. The service scale includes, for example, a site of the customer environment 100 using the user service, the number of print jobs at the site, and the number of devices 30 at the site. When a customer has a customer environment 100 at a plurality of sites, the service scale includes a plurality of sites and the number of jobs and the number of devices corresponding to each of the plurality of sites.

(S2) The environment building apparatus 10 creates an optimum environment building plan based on the service scale input from the terminal device 20. Then, the environment building apparatus 10 presents the created environment building plan to the terminal device 20. In this way, an environment building plan satisfying the service scale input by the user of the terminal device 20 and with necessary performance and number of virtual servers at the lowest cost is presented to the user. Also, a data center or the like where the virtual server is built is also presented as a part of environment building plan.

The infrastructure providing environment 200 includes a plurality of data center environments 240 that exist at physically different locations. For example, a data center environment 240A existing in the eastern part of the United States of America and a data center environment 240B existing in the western side of the United States of America may be included. In this case, the virtual server to use the user service for the device 30 installed in the customer environment 100A and the customer environment 100B is suggested to use the geographically close data center environment 240A, in the environment building plan. Similarly, the virtual server to use the user service for the device 30 installed in the customer environment 100C is suggested to use the geographically close data center environment 240B in the environment building plan.

(S3) The terminal device 20 inputs a provisioning instruction to the environment building apparatus 10 when building a virtual server according to the environment building plan presented from the environment building apparatus 10.

(S4) When the provisioning instruction is input from the terminal device 20, the environment building apparatus 10 transmits a provisioning request to the web application programming interface (API) 230 that is released by the infrastructure provider. The web API 230 is an API for building a virtual server in the infrastructure providing environment 200. By transmitting the provisioning request to the web API 230, the environment building apparatus 10 can build the virtual server in the infrastructure providing environment 200. The provisioning request includes, for example, the data center where the virtual server is to be built, the number of virtual servers, and the performance of the virtual server.

Thereby, for example, a device management server 220A for managing the device 30 installed in the customer environment 100A and a device management server 220B for managing the device 30 installed in the customer environment 100B are built in the data center environment 240A. Likewise, for example, a device management server 220C for managing the device 30 installed in the customer environment 100C is built in the data center environment 240B.

In addition, a control server 210 for managing each device management server 220 is built in the data center environment 240A. The control server 210 may be built in the data center environment 240B, or the control server 210 may not be built.

As described above, the environment building apparatus 10 according to the present embodiment presents to the user the optimum environment building plan corresponding to the service scale (scale of the user service) input by the user of the terminal device 20. Then, according to the provisioning instruction input by the user of the terminal device 20, the environment building apparatus 10 according to the present embodiment builds the virtual server presented as the environment building plan.

Therefore, the user of the terminal device 20 can build the virtual server with the optimum environment building plan by simply inputting the service scale without considering the performance and the number of virtual servers required for using the user service, location relationship between the customer environment 100 and the data center, and the like.

Hardware Configuration Hereinafter, a hardware configuration of the environment building apparatus 10, the terminal device 20, and the device 30 according to the present embodiment is described.

Figure 3:
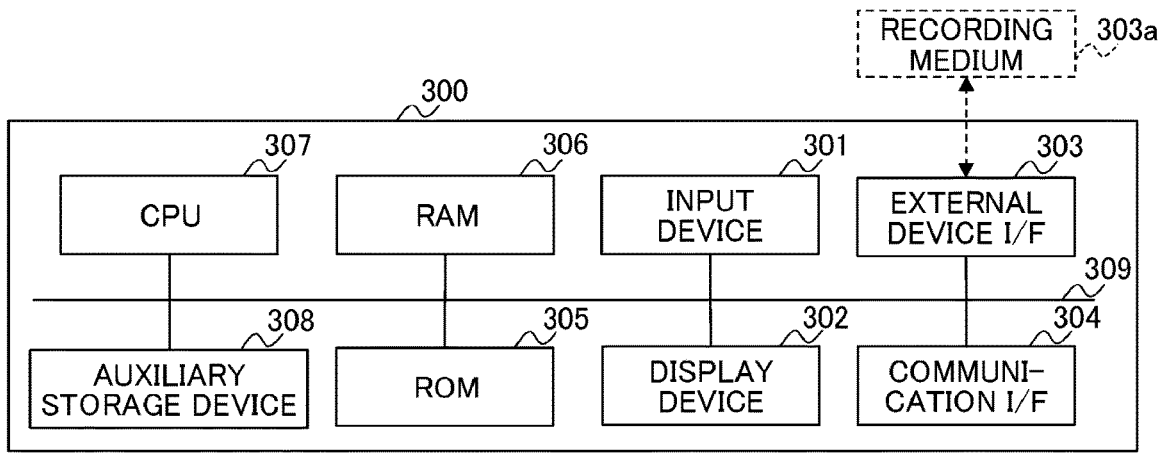
FIG. 3 is a block diagram illustrating an example of a hardware configuration of a computer according to embodiments of the present disclosure.

The environment building apparatus 10 and the terminal device 20 according to the present embodiment can be implemented by using one or more computers 300 illustrated in FIG. 3, for example. FIG. 3 is a block diagram illustrating an example of a hardware configuration of a computer 300 according to the present embodiment. When the device 30 is a PC or the like, the device 30 can also be implemented by using one or more computers 300 illustrated in FIG. 3, for example.

The computer 300 illustrated in FIG. 3 includes an input device 301, a display device 302, an external device interface (I/F) 303, and a communication I/F 304. The computer 300 illustrated in FIG. 3 also includes a read only memory (ROM) 305, a random access memory (RAM) 306, a central processing unit (CPU) 307, and an auxiliary storage device 308. Each of these hardware resources are connected to each other by a bus 309.

The input device 301 is, for example, a keyboard, a mouse, a touch panel, or the like, and is used by the user to input various operations. The display device 302 is, for example, a display or the like, and displays the processing result by the computer 300. The computer 300 may include at least one of the input device 301 or the display device 302.

The external device I/F 303 is an interface with an external device. The external device includes a recording medium 303a and the like. The external device I/F 303 enables the computer 300 to read or write data from or to the recording medium 303a. Examples of the recording medium 303a include a flexible disc, a compact disc (CD), a digital versatile disc (DVD), a secure digital (SD) memory card, and a universal serial bus (USB) memory.

The communication I/F 304 is an interface to connect the computer 300 to a network. The computer 300 can communicate with other devices and the like through the communication I/F 304.

The ROM 305 is a nonvolatile semiconductor memory capable of holding programs and data even when the power is turned off. The ROM 305 stores programs or data such as a basic input output system (BIOS), which is activated when the computer 300 is started up, operating system (OS) settings, and network settings. The RAM 306 is a volatile semiconductor memory that temporarily holds programs and data.

The CPU 307 reads programs and data from the ROM 305 or the auxiliary storage device 308 onto the RAM 306 and executes processing for controlling the computer 300 or implementing a function of the computer 300.

The auxiliary storage device 308 is, for example, a hard disk drive (HDD), a solid-state drive (SSD) or the like and is a nonvolatile storage device that stores programs and data. Examples of the programs or data stored in the auxiliary storage device 308 include an operating system (OS) for controlling an entire operation of the computer 300, an application program providing various functions on the OS, and one or more programs for implementing the present embodiment. The auxiliary storage device 308 manages stored programs and data by a predetermined file system or database (DB).

The environment building apparatus 10 and the terminal device 20 according to the present embodiment can execute various processes with the hardware configuration of the computer 300 illustrated in FIG. 3. The control server 210 and the device management server 220 (more accurately, a physical server that implements the control server 210 and the device management server 220) are implemented by the hardware configuration of the computer 300 illustrated in FIG. 3.

Figure 4:
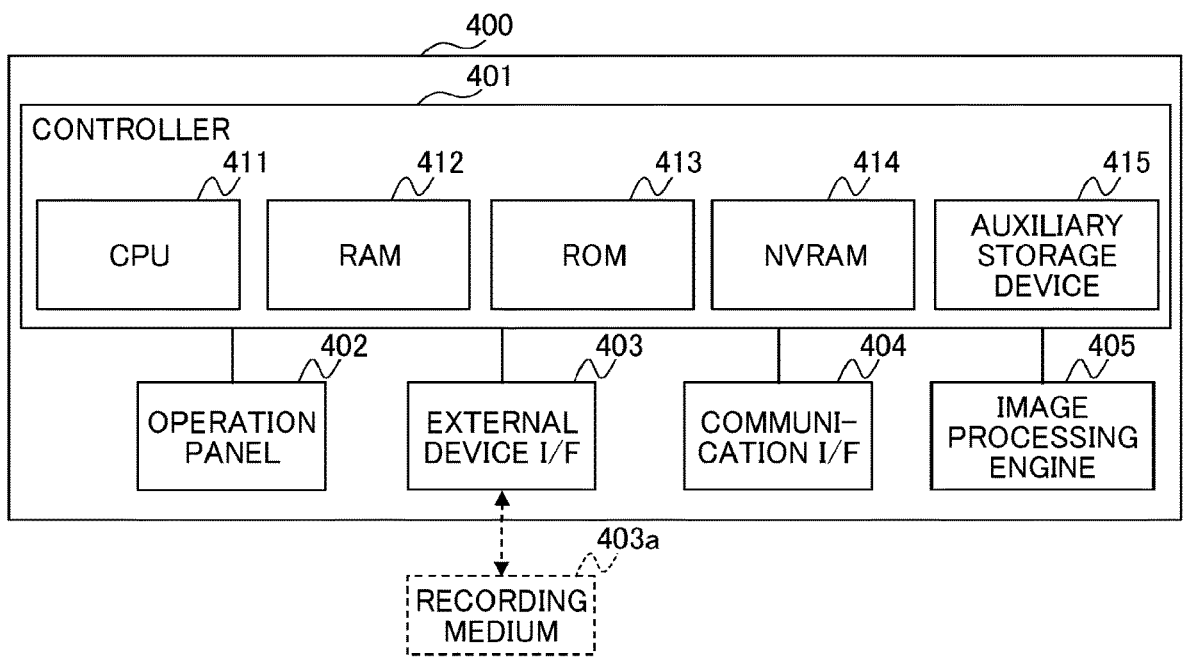
FIG. 4 is a block diagram illustrating an example of a hardware configuration of an image forming apparatus according to embodiments of the present disclosure.

When the device 30 is an image forming apparatus, the device 30 can be implemented by the image forming apparatus 400 illustrated in FIG. 4, for example. FIG. 4 is a block diagram illustrating an example of a hardware configuration of an image forming apparatus 400.

The image forming apparatus 400 illustrated in FIG. 4 includes a controller 401, an operation panel 402, an external device I/F 403, a communication I/F 404, and an image processing engine 405. Further, the controller 401 includes a CPU 411, a RAM 412, a ROM 413, a non-volatile random access memory (NVRAM) 414, and an auxiliary storage device 415.

The ROM 413 is a nonvolatile semiconductor memory capable of holding programs and data even when the power is turned off. The RAM 412 is a volatile semiconductor memory that temporarily holds programs and data. The NVRAM 414 is a nonvolatile semiconductor memory that stores setting information and the like, for example. The auxiliary storage device 415 is, for example, an HDD, an SSD or the like and is a nonvolatile storage device that stores programs and data.

The CPU 411 loads programs, data, or setting information from the ROM 413, the NVRAM 414, the auxiliary storage device 415 and the like, onto the RAM 412 and executes processes to implement entire control and functions of the image forming apparatus 400.

The operation panel 402 includes an input device that receives a user input, and a display device that displays various types of information. The external device I/F 403 is an interface with an external device. The external device includes a recording medium 403a and the like. The image forming apparatus 400 can read and write the data from or to the recording medium 403a through the external device I/F 403.

Examples of the recording medium 403a include a flexible disc, a CD, a DVD, an SD memory card, and a USB memory.

The communication I/F 404 is an interface for connecting the image forming apparatus 400 to the network. The image forming apparatus 400 can communicate with other devices and the like through the communication I/F 404.

The image processing engine 405 is, for example, a plotter, a scanner, or the like, and is a device that performs various types of image processing such as printing and scanning.

When the device 30 according to the present embodiment is an image forming apparatus, the device 30 can implement various processes with the hardware configuration of the image forming apparatus 400 illustrated in FIG. 4.

[Functional Configuration]

Figure 5:
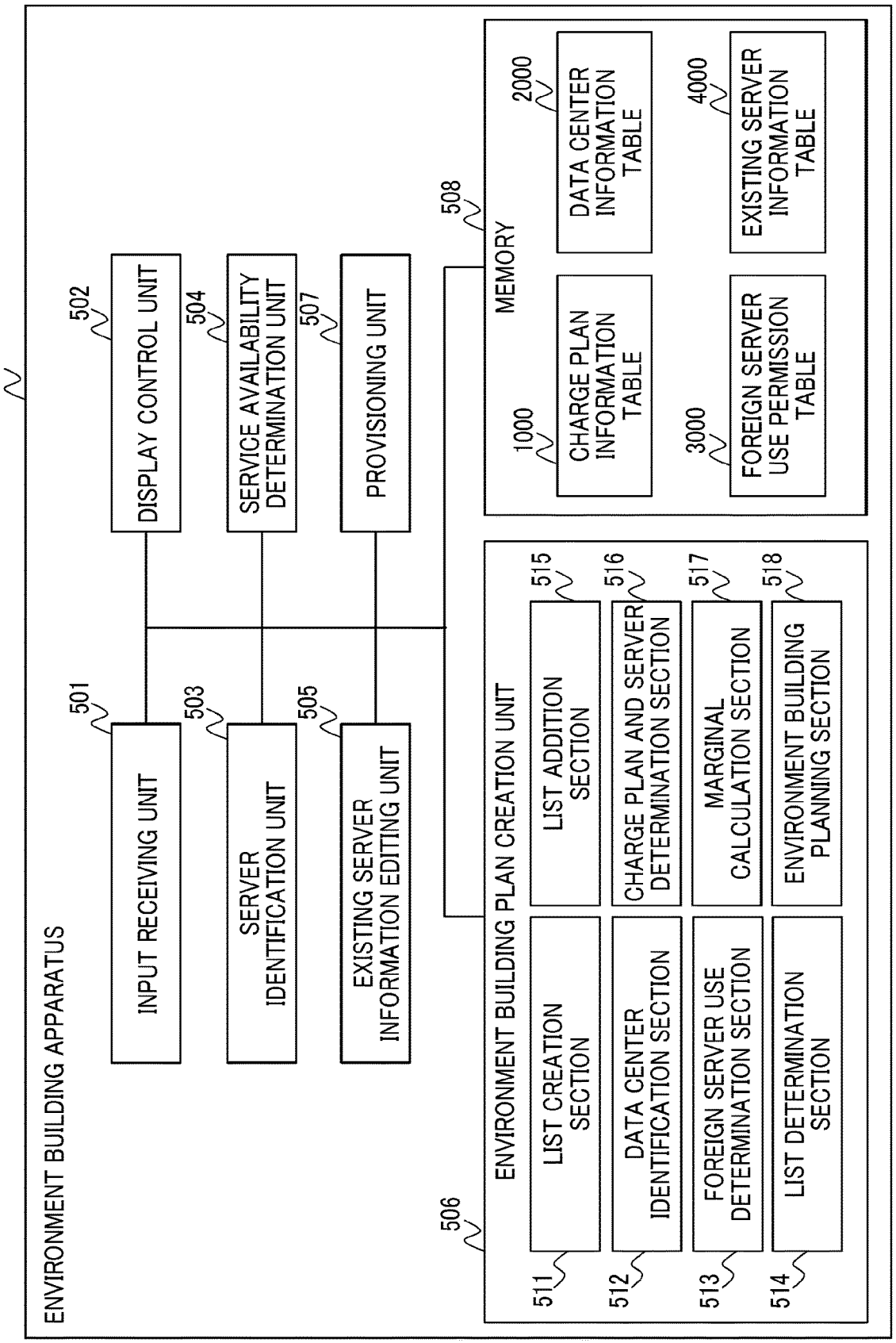
FIG. 5 is a block diagram illustrating an example of a functional configuration of an environment building apparatus according to embodiments of the present disclosure.

Hereinafter, a functional configuration of the environment building apparatus 10 according to the present embodiment is described with reference to FIG. 5. FIG. 5 is a block diagram illustrating an example of the functional configuration of the environment building apparatus 10 according to the present embodiment.

As illustrated in FIG. 5, the environment building apparatus 10 according to the present embodiment includes an input receiving unit 501, a display control unit 502, a server identification unit 503, a service availability determination unit 504, an existing server information editing unit 505, an environment building plan creation unit 506, and a provisioning unit 507. These components are implemented by processes that one or more programs installed in the environment building apparatus 10 causes the CPU 307 to execute.

Further, the environment building apparatus 10 according to the present embodiment includes a memory 508. The memory 508 can be implemented by using the auxiliary storage device 308, for example. The memory 508 may also be implemented by using a storage device or the like connected to the environment building apparatus 10 through a network, for example.

The memory 508 stores a charge plan information table 1000, a data center information table 2000, a foreign server use permission table 3000, and an existing server information table 4000. Details of the tables stored in the memory 508 are described below.

The input receiving unit 501 receives various inputs from the terminal device 20 (for example, input of service scale and input of provisioning instruction, etc.).

The display control unit 502 displays various screens on the terminal device 20. Examples of the various screens include a screen for the user of the terminal device 20 to input the service scale, a screen for presenting the environment building plan to the user of the terminal device 20 and a screen for the user to input the provisioning instruction.

When input of the service scale is received by the input receiving unit 501, the server identification unit 503 refers to the existing server information table 4000 stored in the memory 508 and determines whether or not the virtual server has been built with reference to the user that input the service scale. That is, the server identification unit 503 determines whether or not the service environment has already been built for the user.

When the server identification unit 503 determines that the virtual server has been built, the service availability determination unit 504 determines whether or not the user service can be provided by the existing virtual server. The service availability determination unit 504 determines that the user service can be provided by the existing server when the user service of the service scale entered by the user can be provided with the existing server (the device management server 220 or the like) without building a new virtual server.

When the service availability determination unit 504 determines that the user service can be provided by the existing server (such as the device management server 220), the existing server information editing unit 505 updates the existing server information stored in the existing server information table 4000. The existing server information is information managed for each user, including the number of jobs (marginal number of jobs) that can be additionally stored by the existing server (device management server 220 or the like), the number of devices that can be additionally managed (the number of marginal devices), and the like.

In addition, when a virtual server (device management server 220 or the like) is built by the provisioning request of the provisioning unit 507, the existing server information editing unit 505 creates the existing server information on the virtual server and stores the existing server information in the existing server information table 4000.

The environment building plan creation unit 506 processes creation of an environment building plan. The environment building plan creation unit 506 creates an environment building plan using the service scale received by the input receiving unit 501 and the various tables stored in the memory 508. The environment building plan creation unit 506 includes a list creation section 511, a data center identification section 512, a foreign server use determination section 513, a list determination section 514, a list addition section 515, a charge plan and server determination section 516, a marginal calculation section 517, and an environment building planning section 518.

The list creation section 511 creates an empty list as a list for managing records (data) indicating the data center where the virtual server is to be built.

The data center identification section 512 refers to the data center information table 2000 stored in the memory 508 and identifies, for example, a data center closest to each site included in the service scale.

The foreign server use determination section 513 refers to the foreign server use permission table 3000 stored in the memory 508 to determine whether or not use of the virtual server built in the data center of another country is allowed in a country where the site is located. This is because, for example, in some countries it is prohibited by laws and regulations to bring out data of the device 30 in its own country to another country.

When it is determined by the foreign server use determination section 513 that the use of the virtual server built in the data center of another country is not permitted, the data center identification section 512 identifies the data center in the same country as the country where the site is located.

The list determination section 514 determines whether or not a record indicating the data center identified by the data center identification section 512 is included in the list.

When the list determination section 514 determines that the record indicating the data center is not included in the list, the list addition section 515 adds the record of the data center to the list.

The charge plan and server determination section 516 refers to the charge plan information table 1000 stored in the memory 508 and identifies the optimum charge plan and number of virtual servers from the number of jobs and the number of devices included in the service scale for each data center indicated by the record included in the list. Note that the charge plan is a charge table determined by the infrastructure provider according to the performance of the virtual server. In general, the larger the number of jobs and the number of devices, expensive charge plan and more virtual servers are required as described below.

The marginal calculation section 517 calculates the number of marginal jobs and the number of marginal devices of the virtual server built in the data center for each data center indicated by the record included in the list.

The environment building planning section 518 creates an environment building plan from the charge plan and the number of units specified by the charge plan and server determination section 516 and the number of marginal jobs and the number of marginal devices calculated by the marginal calculation section 517. The environment building plan includes the number of virtual servers required to provide the user service satisfying the service scale, the data center in which the virtual server is built, the charge plan, the total charge, the number of marginal jobs and the number of marginal devices when building the virtual server, and the like. The environment building plan may not include the number of marginal jobs and the number of marginal devices when building the virtual server.

When input of the provisioning instruction is accepted by the input receiving unit 501, the provisioning unit 507 transmits a provisioning request to the web API 230 released by the infrastructure provider. As a result, a virtual server corresponding to the provisioning request is built in the infrastructure providing environment 200.

Charge Plan Information Table 1000

Hereinafter, a description is given of the charge plan information table 1000 stored in the memory 508, with reference to FIG. 6. FIG. 6 is a diagram illustrating an example of the charge plan information table 1000.

As illustrated in FIG. 6, charge plan information is stored in the charge plan information table 1000. The charge plan information for each charge plan includes "charge plan", "CPU", "memory", "number of jobs", "number of devices", and "charge" as data items.

In the "charge plan", the name of the charge plan is set. In "CPU", the number of CPU cores allocated to one virtual server built with the charge plan is set. In "memory", the capacity of the memory allocated to one virtual server built with the charge plan is set. In the "number of jobs", the maximum number of print jobs that can be stored by one virtual server (device management server 220 or the like) built with the charge plan is set. In the "number of devices", the maximum number of devices 30 which can be managed by one virtual server (device management server 220 or the like) built with the charge plan is set. "Charge" is a charge (for example, a monthly charge) when one virtual server is built with the charge plan.

In the example illustrated in FIG. 6, the charge plan information for four charge plans "Minimum" to "Super High" is stored in the charge plan information table 1000. The charge plan information indicates that the higher the charge, the higher the number of CPU cores and the greater the memory capacity, the number of jobs that can be stored, and the number of devices that can be managed are allocated to the virtual server (that is, the higher the charge, the higher the performance of the virtual server which will be built).

As described above, the charge plan information table 1000 stores charge plan information indicating the content of charge plan (virtual server performance, charge, etc.) when building a virtual server. The content of the charge plan is determined by the infrastructure provider.

Data Center Information Table 2000

Hereinafter, a description is given of the data center information table 2000 stored in the memory 508, with reference to FIG. 7. FIG. 7 is a diagram illustrating an example of the data center information table 2000.

As illustrated in FIG. 7, data center information is stored in the data center information table 2000. The data center information includes "data center", "location", and "country" as data items.

In the "data center", the name of the data center is set. In "location", geographical location (for example, latitude and longitude etc.) of the data center is set. In "country", name of a country where the data center is located is set.

As described above, the data center information table 2000 stores data center information indicating the data center in which the virtual server is to be built.

Foreign Server Use Permission Table 3000

Hereinafter, a description is given of a foreign server use permission table 3000 stored in the memory 508, with reference to FIG. 8. FIG. 8 is a diagram illustrating an example of the foreign server use permission table 3000.

As illustrated in FIG. 8, foreign server use permission information for one or more countries is stored in the foreign server use permission table 3000. The foreign server use permission information for each country includes "country" and "foreign server use permission flag" as data items.

In "country", name of a country is set. The "foreign server use permission flag" indicates whether or not use of the virtual server built in the data center of another country is permitted in the country (in other words, the use of the virtual server built in the data center of another country is prohibited or not).

In the example illustrated in FIG. 8, the foreign server use permission flag "No" is set in the foreign server use permission information of "Germany". This means that the device 30 in Germany cannot use the virtual server built in the data center of another country, for example, due to legal reasons.

As described above, the foreign server use permission table 3000 stores foreign server use permission information for each country that indicates whether or not the device 30 in each country is permitted to use the virtual server built in the data center of another country.

Existing Server Information Table 4000

Hereinafter, a description is given of the existing server information table 4000 stored in the memory 508, with reference to FIG. 9. FIG. 9 is a diagram illustrating an example of the existing server information table 4000.

As illustrated in FIG. 9, existing server information for one or more virtual servers is stored in the existing server information table 4000. The existing server information for each virtual server includes "customer ID", "virtual server", "data center", "number of marginal jobs", and "number of marginal devices" as data items.

For the "customer ID", a customer ID for identifying a customer who uses the user service is set. In the "virtual server", information for identifying one or more virtual servers (such as the device management server 220) built for the customer is set. In the "data center", the name of the data center in which the virtual server is built is set. In the "number of marginal jobs", the number of jobs (marginal number of jobs) that the virtual server (device management server 220 or the like) can additionally accumulate is set. In the "number of marginal devices", the number of devices 30 (number of marginal devices) which can be additionally managed by the virtual server (device management server 220 or the like) is set.

As described above, in the existing server information table 4000, existing server information indicating information on the virtual server built for each customer is stored.

Details of Processing

Figure 10:
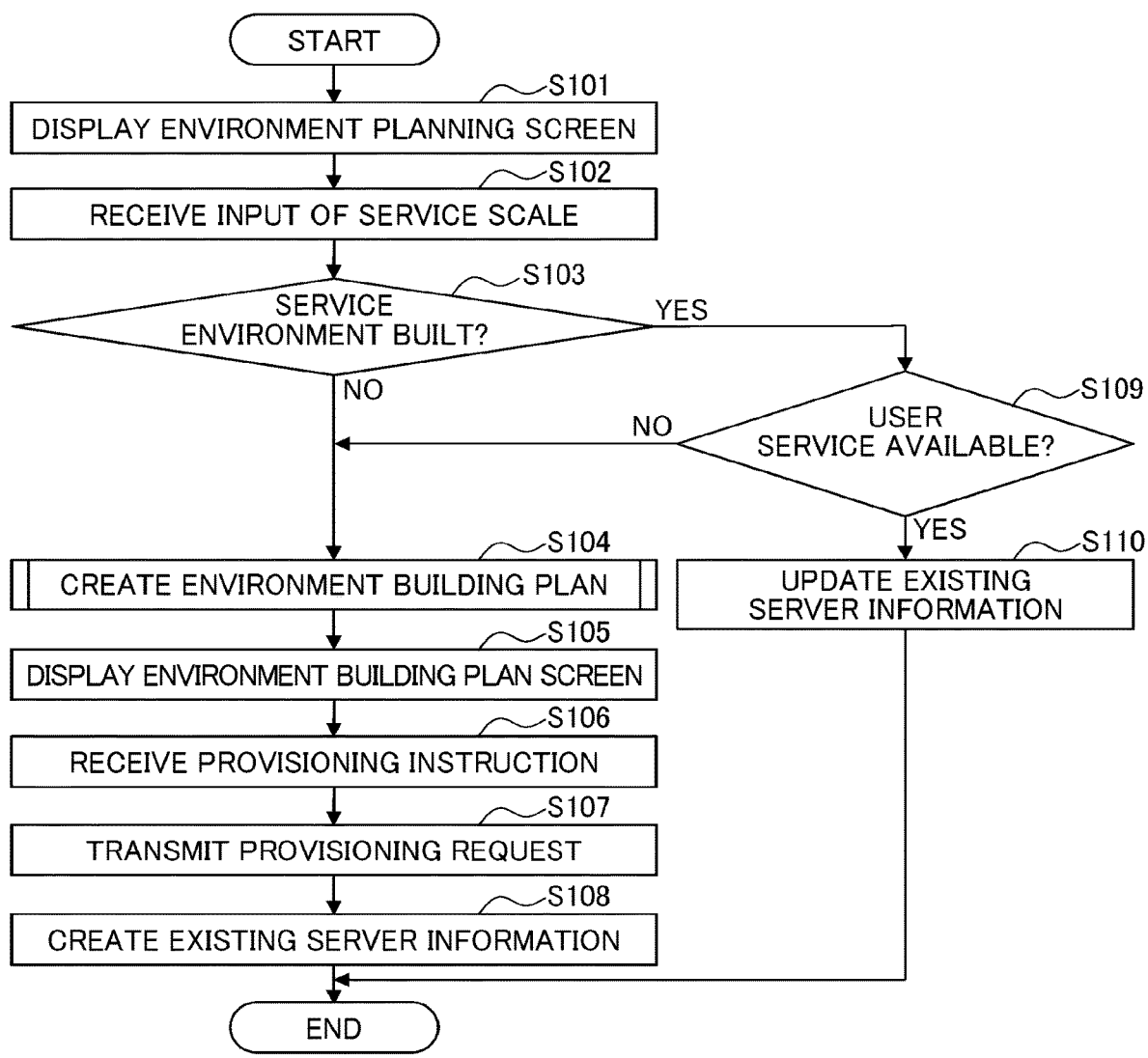
FIG. 10 is a flowchart illustrating an example of a process executed by the environment building apparatus according to embodiments of the present disclosure.

Hereinafter, a detailed description is given of processing executed by the environment building apparatus 10 according to the present embodiment (presentation of an environment building plan and construction of a service environment) is described with reference to FIG. 10. FIG. 10 is a flowchart illustrating an example of a process executed by the environment building apparatus 10 according to the present embodiment.

Figure 11:
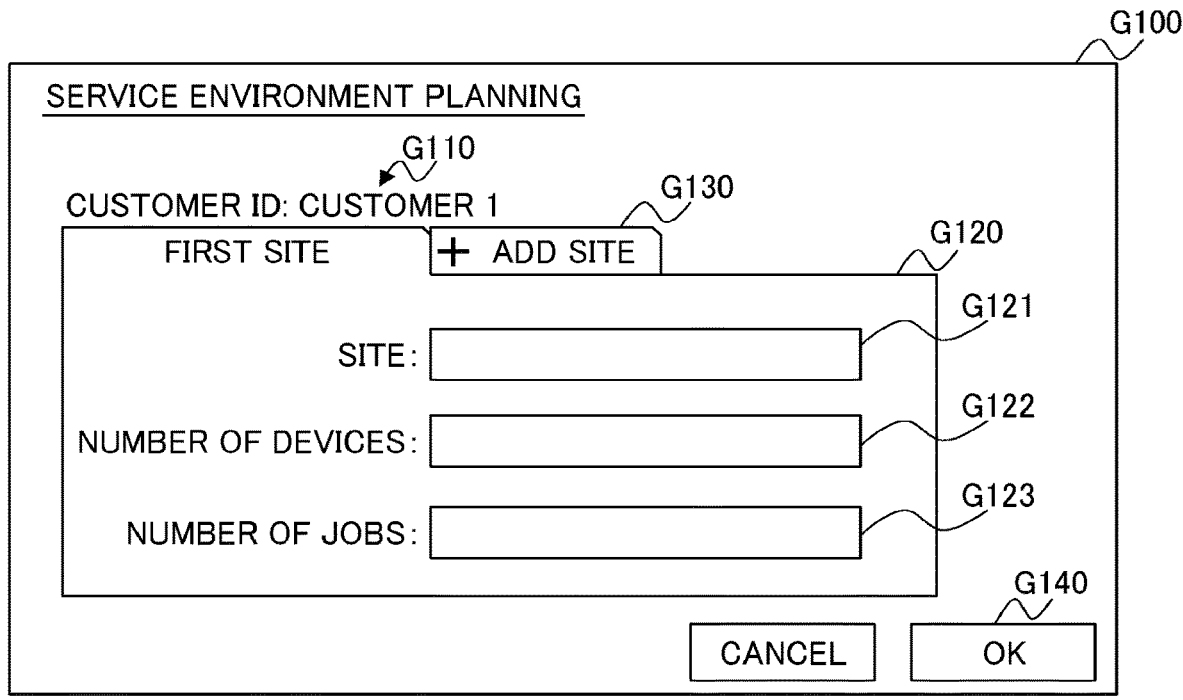
FIG. 11 is a diagram illustrating an example of an environment planning screen.

In step S101, in response to a request from the terminal device 20, the display control unit 502 causes the terminal device 20 to display, for example, an environment planning screen G100 illustrated in FIG. 11. The user of the terminal device 20 displays the environment planning screen G100 illustrated in FIG. 11, for example, by inputting a certain uniform resource locator (URL) to the web browser or pressing a link to the URL.

The environment planning screen G100 illustrated in FIG. 11 is a screen for entering the scale of the user service in building a service environment (that is, the building of a virtual server). The environment planning screen G100 illustrated in FIG. 11 includes a customer ID display field G110, a service scale input field G120 per site, a site addition button G130, and an OK button G140. Further, the service scale input field G120 for each site includes a site input field G121, a device number input field G122, and a job number input field G123.

In the customer ID display field G110, the customer ID indicating the company, etc., to which the user of the terminal device 20 belongs is displayed.

The user inputs a site (for example, information indicating a geographical location such as a state, prefecture, city, town, village, address, latitude, longitude, etc.) in the site input field G121. In addition, the user inputs the number of devices 30 installed in the customer environment 100 of the site into the device number input field G122 and inputs the number of jobs expected to be used in the customer environment 100 into the job number input field G123. The number of jobs input to the job number input field G123 is the number of jobs of a print job per unit period, for example, one month.

By pressing the site addition button G130, the user can add the service scale input field G120 for a site. Thereby, when the customer environment 100 exists in a plurality of sites, the user can input the number of devices and the number of jobs for each site (that is, for each customer environment 100 of the site). These sites and the number of devices and the number of jobs for each site are the scale of the user service.

Then, the user of the terminal device 20 can input the service scale by pressing the OK button G140.

In step S102, the input receiving unit 501 receives the input of the service scale of the user of the terminal device 20. The service scale received by the input receiving unit 501 includes the customer ID of the company, etc. to which the user belongs, the site input to the site input field G121, the number of devices input to the device number input field G122, the number of jobs input to the job number input field G123. In other words, the service scale includes one or more combinations of the site, the number of devices, and the number of jobs.

In step S103, the server identification unit 503 refers to the existing server information table 4000 and determines whether or not the service environment for the company or the like to which the user of the terminal device 20 belongs has been built. When the existing server information of the customer ID indicating the company or the like to which the user of the terminal device 20 belongs is stored in the existing server information table 4000, the server identification unit 503 determines that the service environment has already been built. On the other hand, when the existing server information of the customer ID indicating the company or the like to which the user of the terminal device 20 belongs is not stored in the existing server information table 4000, the server identification unit 503 determines that no service environment is built.

When it is determined in step S103 that no service environment has been built, the environment building plan creation unit 506 creates an environment building plan (environment building plan creating process) in step S104.

Figure 12:
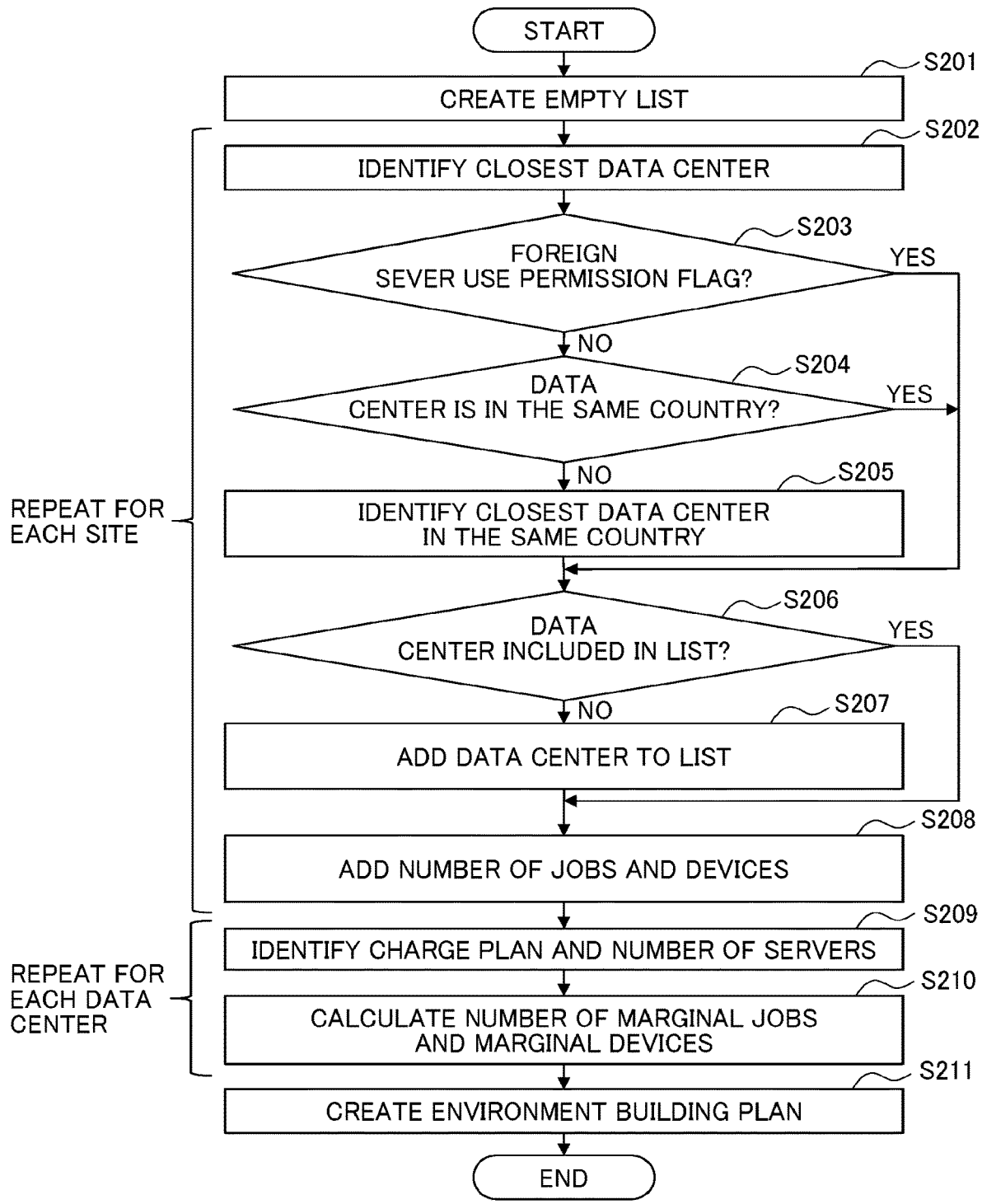
FIG. 12 is a flowchart illustrating an example of an environment building plan creating process according to embodiments of the present disclosure.

A detailed description is given below of the environment building plan creating process with reference to FIG. 12. FIG. 12 is a flowchart illustrating an example of an environment building plan creating process according to the present embodiment.

In step S201, the list creation section 511 of the environment building plan creation unit 506 creates an empty list as a list for managing records indicating the data center where the virtual server is to be built.

The environment building plan creation unit 506 repeats the subsequent processing of steps S202 to S208 for each site included in the service scale. For example, when the service scale includes three sites consisting of the first site, the second site, and the third site, the environment building plan creation unit 506 executes processing from step S202 to step S208 for each of the first site to the third site.

In step S202, the data center identification section 512 of the environment building plan creation unit 506 refers to the data center information table 2000 and identifies the data center closest to the site included in the service scale. That is, the data center identification section 512 refers to the "location" of the data center information stored in the data center information table 2000 and identifies the data center closest to the site included in the service scale.

In step S203, the foreign server use determination section 513 of the environment building plan creation unit 506 refers to the foreign server use permission table 3000 to determine whether or not the foreign server use permission flag of a country where the site belongs is "Yes". That is, after identifying the country where the site is located, the foreign server use determination section 513 refers to the foreign server use permission information stored in the foreign server use permission table 3000 and determines whether the foreign server use permission flag corresponding to the country where the site is located is "Yes" or not.

When the foreign server use permission flag is "Yes" in step S203, the environment building plan creation unit 506 proceeds to step S206.

On the other hand, when the foreign server use permission flag is "No" in step S203, the foreign server use determination section 513 of the environment building plan creation unit 506 determines whether or not the country where the data center identified in the above step S202 is located and the country where the site is located are the same country, in step S204.

In step S204, when the country in which the data center is located and the country in which the site is located are the same country, the environment building plan creation unit 506 proceeds to step S206.

On the other hand, when the country in which the data center is located and the country in which the site is located are not the same country, in step S205, the data center identification section 512 of the environment building plan creation unit 506 refers to the data center information table 2000 and identifies the data center closest to the site among the data centers in the country in which the site is located. That is, the data center identification section 512 refers to the "location" and "country" of the data center information stored in the data center information table 2000 and identifies the data center closest to the site. As described above, if the use of the virtual server built in the data center of another country is not permitted in a country where the site is located, the data center in the country where the site is located is identified.

In step S206, the list determination section 514 of the environment building plan creation unit 506 determines whether or not a record indicating the data center identified in the above step S202 or step S205 is included in the list.

In step S206, when the record indicating the data center is included in the list, the environment building plan creation unit 506 proceeds to step S208.

On the other hand, when the record indicating the data center is not included in the list in step S206, the list addition section 515 of the environment building plan creation unit 506 adds a record indicating the data center to the list, in step S207. Here, the record includes the information indicating the data center (for example, the name of the data center), the total number of jobs accumulated per unit period in the virtual server built in the data center, and the total number of devices of the device 30 managed by the virtual server built in the data center. The total number of jobs and the total number of devices included in the record added in step S207 is set to 0 as the initial value.

In step S208, the list addition section 515 of the environment building plan creation unit 506 adds the number of jobs and the number of devices corresponding to the site to the record indicating the data center identified in the above-described step S202 or step S205. That is, the list addition section 515 adds the number of jobs and the number of devices associated with the site among the number of jobs and the number of devices included in the service scale to the total number of jobs and the total number of devices included in the record respectively.

The processes in steps S202 to S208 are repeatedly executed for each site included in the service scale. As a result, the total number of jobs accumulated per unit period in the virtual server built in the data center and the total number of devices of the device 30 managed by the virtual server built in the data center is calculated for each data center.

The environment building plan creation unit 506 repeatedly executes the processing of steps S209 to S210 for each record included in the list (that is, for each data center indicated by the record).

In step S209, the charge plan and server determination section 516 of the environment building plan creation unit 506 refers to the charge plan information table 1000 and identifies the optimum charge plan and the number of virtual servers to be built in the data center indicated by the record, from the total number of jobs and the total number of devices included in the record. That is, the charge plan and server determination section 516 identifies a charge plan (or a combination of charge plans) that satisfies the total number of jobs and the total number of devices included in the record with the lowest charge.

For example, it is assumed that the total number of jobs and the total number of devices included in the record indicating the data center is 400 jobs and 400 units, respectively. In this case, it is cheapest to implement the user service by building one virtual server of the charge plan "Minimum". Therefore, the charge plan and server determination section 516 identifies one virtual server with a charge plan "Minimum" as the charge plan and number of virtual servers to be built in the data center.

Further, for example, it is assumed that the total number of jobs and the total number of devices included in the record indicating the data center is 500 jobs and 1500 units, respectively. In this case, it is cheapest to implement the user service by building one virtual server of the charge plan "Basic". Therefore, the charge plan and server determination section 516 identifies one virtual server of the charge plan "Basic" as the charge plan and number of virtual servers to be built in the data center.

Further, for example, it is assumed that the total number of jobs and the total number of devices included in the record indicating the data center is 23000 jobs and 20000 units, respectively. In this case, it is cheapest to implement the user service by building two virtual servers of the charge plan "Super High" and one virtual server of the charge plan "High". Therefore, the charge plan and server determination section 516 uses two virtual servers of the charge plan "Super High" and one virtual server of the charge plan "High" as the charge plan and number of the virtual servers built in the data center.

As described above, the charge plan and server determination section 516 identifies the optimum charge plan and number of virtual servers to be built in the data center for each data center. Note that the optimum charge plan and the number of units are the charge plans and the number of units that satisfy the sum of the number of jobs and the total number of devices and the lowest charge as described above.

In step S210, the marginal calculation section 517 of the environment building plan creation unit 506 calculates the number of marginal jobs and the number of marginal devices from the charge plan and the number of virtual servers identified in the above step S209 and the number of jobs and the number of devices included in the record indicating the data center.

For example, it is assumed that the total number of jobs and the total number of devices included in the record indicating the data center is 400 jobs and 400 units respectively, and one virtual server having the charge plan "Minimum" is identified in the above step S209. In this case, the maximum number of jobs that can be stored in one virtual server of the charge plan "Minimum" and the maximum number of devices that can be managed are 500 jobs and 500 units, respectively. Therefore, the marginal calculation section 517 calculates the number of marginal jobs as 100 jobs and the number of marginal devices as 100 units.

Further, for example, it is assumed that the total number of jobs and the total number of devices included in the record indicating the data center is 23000 jobs and 20000 units, respectively. Further, it is assumed that the charge plan and the number of virtual servers identified in the above step S209 are two virtual servers with a charge plan "Super High" and one virtual server with a charge plan "High". In this case, the maximum number of jobs that can be accumulated and the maximum number of devices that can be managed in two virtual servers with the charge plan "Super High" and one virtual server with the charge plan "High" are 25000 jobs and 27500 units, respectively. Therefore, the marginal calculation section 517 calculates the number of marginal jobs as 4500 jobs and the number of marginal devices as 7500 units.

As described above, the marginal calculation section 517 calculates the number of marginal jobs and the number of marginal devices for each data center.

By repeating the processing of steps S209 to S210 for each data center, the optimum charge plan, the number of virtual servers, the number of marginal jobs, and the number of marginal devices can be obtained for each data center.

In step S211, the environment building planning section 518 of the environment building plan creation unit 506 creates an environment building plan from the charge plan and the number of units identified in the above step S209 and the number of marginal jobs and the number of marginal devices calculated in the above step S210. The environment building plan includes the charge plan, total charge, the number of virtual servers, the number of marginal jobs, and the number of marginal devices for each data center.

In step S105 as illustrated in FIG. 10, the display control unit 502 causes the terminal device 20 to display, for example, the environment building plan screen G200 illustrated in FIG. 13.

The environment building plan screen G200 illustrated in FIG. 13 is a screen on which the environment building plan created by the environment building plan creation unit 506 is displayed. The environment building plan screen G200 illustrated in FIG. 13 includes a charge plan display field G210 and a marginal display field G220 as an environment building plan created by the environment building plan creation unit 506.

In the charge plan display field G210, the charge plan and the number of virtual servers built for each data center are displayed for the service scale input by the user. In the example illustrated in FIG. 13, the user service in the sites "New York" and "Newark" can be implemented with the lowest charge by building one virtual server with the charge plan "High" and two virtual servers with the charge plan "Super High" in a data center "United States (US) East". Similarly, in the example illustrated in FIG. 13, the user service in the site "Berlin" can be implemented with the lowest charge by building one virtual server with the charge plan "Minimum" and one virtual server with the charge plan "Basic" in a data center "Germany". Similarly, in the example illustrated in FIG. 13, the user service at the site "Tokyo" can be implemented with the lowest charge by building one virtual server of the charge plan "Minimum" at a data center "Japan East". Further, in the charge plan display field G210, the total charge for the virtual servers included in the environment building plan is also displayed.

In the marginal display field G220, the number of marginal jobs and the number of marginal devices for each data center when building the virtual server displayed in the charge plan display field G210 are displayed. Further, in the marginal display field G220, the total number of marginal jobs and the total number of marginal devices are also displayed.

As described above, the user of the terminal device 20 can know the optimum charge plan and the number of virtual servers required for the user service of the service scale input by the user. In addition, the user of the terminal device 20 can know the number of marginal jobs and the number of marginal devices when the virtual server with the optimum charge plan and the number of servers is built.

The user of the terminal device 20 can input the provisioning instruction by pressing the OK button G230.

In step S106, the input receiving unit 501 receives the provisioning instruction input by the user of the terminal device 20. The provisioning instruction received by the input receiving unit 501 includes the charge plan and the number of virtual servers for each data center displayed in the charge plan display field G210 as an environment building plan.

In step S107, the provisioning unit 507 transmits a provisioning request to the web API 230 released by the infrastructure provider. The provisioning unit 507 transmits, for each data center, a provisioning request including information indicating the charge plan and information indicating the number of virtual servers for the charge plan. As a result, one or more virtual servers corresponding to the charge plan are built in the corresponding data center environment 240 of the infrastructure providing environment 200.

After the provisioning unit 507 built the virtual server in the infrastructure providing environment 200, it is necessary to install a program for implementing the user service in the virtual server. For example, the provisioning unit 507 needs to install a program for causing the virtual server built in the infrastructure providing environment 200 to function as the device management server 220 in the virtual server. Therefore, after the virtual server is built, the provisioning unit 507 transmits the installation request of the necessary program to the virtual server.

In the above step S107, a virtual server to be made to function as the device management server 220 is built. In addition, the provisioning unit 507 also builds a virtual server to function as the control server 210.

When the virtual server (the device management server 220 or the like) is built by the provisioning request of the above step S107, the existing server information editing unit 505 creates existing server information on the virtual server. In step S108, the existing server information editing unit 505 stores the created existing server information in the existing server information table 4000.

When it is determined in step S103 that the service environment is already built, the service availability determination unit 504 determines whether the user service is available in the existing server in step S109.

Whether or not the user service is available in the existing server is determined, for example, by the following (1) to (4).

(1) First, like the above-described step S202 or step S205, the data center identification section 512 identifies the data center closest to each site included in the service scale.

(2) Next, the service availability determination unit 504 refers to the existing server information table 4000 and identifies the number of marginal jobs and the number of marginal devices of the identified data center.

(3) Subsequently, the service availability determination unit 504 determines whether or not the number of jobs and the number of devices corresponding to the site are equal to or less than the specified marginal number of jobs and the number of marginal devices respectively.

(4) The service availability determination unit 504 determines that the user service is available in the existing server when the number of jobs and the number of devices corresponding to the site are less than or equal to the identified marginal job number and less than or equal to the marginal device number respectively. On the other hand, when the number of jobs exceeds the number of marginal jobs or when the number of devices exceeds the number of marginal devices, the service availability determination unit 504 determines that the user service is not available on the existing server.

When it is determined in step S109 that the user service is not available in the existing server, the processing in step S104 is executed. On the other hand, when it is determined that the user service is available in the existing server in step S109, the existing server information editing unit 505 updates the existing server information stored in the existing server information table 4000 in step S110. In other words, the existing server information editing unit 505 identifies the customer ID and the existing server information including the data center, among the existing server information stored in the existing server information table 4000. Then, the existing server information editing unit 505 compares the number of jobs and the number of devices included in the service scale with the number of marginal jobs and the number of marginal devices of the identified existing server information, the number of jobs and the number of devices corresponding to the site and adds each number respectively. As a result, the number of marginal jobs and the number of marginal devices in the corresponding existing server information are updated.

As described above, the environment building apparatus 10 according to the present embodiment presents the optimum environment building plan in accordance with the scale of the user service desired by the user of the terminal device 20 (for example, the usage amount per unit period for each site (the number of jobs etc.) and the number of devices). Thereby, the user of the terminal device 20 can know the optimum charge plan and the number of the virtual servers for using the user service. Therefore, the user of the terminal device 20 can easily build the virtual server without calculation or the like necessary for determining a charge plan or the number of virtual servers.

The above-described embodiments are illustrative and do not limit the present disclosure. Numerous additional modifications and variations are possible in light of the above teachings. For example, elements and/or features of different illustrative embodiments may be combined with each other and/or substituted for each other within the scope of this disclosure and appended claims. In addition, any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the internet. The processing apparatuses can compromise any suitably programmed apparatuses such as a general-purpose computer, personal digital assistant, mobile telephone (such as a wireless application protocol (WAP) or 3G-compliant phone) and so on. Since the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid-state memory device.

The hardware platform includes any desired kind of hardware resources including, for example, a CPU, a RAM, and an HDD. The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system, comprising:
   circuitry configured to
   receive, from a terminal device, input values indicating a service scale of a user service, the input values including a usage amount, a number of devices, and an input site location;
   determine a data center location and an optimum number of virtual servers of each of a plurality of virtual server types for providing the user service at the data center location, so as to minimize a total cost, based on the input values included in the received service scale, by referring to a stored table in which performance values and a charge of each of the plurality of virtual server types are associated with each other;
   determine a charge plan from the stored table and from the determined optimum number of virtual servers of each of the plurality of virtual server types;
   display information including the determined charge plan and the determined optimum number of virtual servers of each of the plurality of virtual server types; and
   build the determined optimum number of virtual servers of each of the plurality of virtual server types according to the determined charge plan, in response to a provisioning instruction received based on the displayed information.

2. The information processing system of claim 1,
   wherein the input values include the input site location, indicating a place of using the user service, the usage amount, and the number of devices, for each of a plurality of input sites; and
   wherein the circuitry is further configured to identify, as the data center location, a data center closest to the input site location, and determine the charge and the number of virtual servers of each of the plurality of virtual server types, for each of the plurality of input sites.

3. The information processing system of claim 2, wherein the circuitry is further configured to:
   determine whether or not a country to which the input site location belongs permits use of a virtual server built in a data center of another country; and
   when it is determined that the country to which the input site location belongs does not permit usage of the virtual server built in the data center of another country, identify a data center closest to the input site location and located in a same country.

4. The information processing system of claim 1,
   wherein the performance values of each of the plurality of the virtual server types include a maximum usage amount and a maximum number of devices that can be connected to a virtual server of the virtual server type; and
   wherein the circuitry is further configured to
   calculate a marginal usage amount indicating a difference between the maximum usage amount of the virtual server and the usage amount included in the input values and a marginal number of devices indicating a difference between the maximum number of devices that can be connected to the virtual server and the number of devices included in the input values; and
   display information including the calculated marginal usage amount and the calculated marginal number of devices.

5. The information processing system of claim 1, wherein the circuitry is further configured to install a program for implementing the user service in the determined optimum number of virtual servers of each of the plurality of virtual server types that has been built.

6. The information processing system of claim 1, wherein the circuitry is further configured to determine the optimum number of virtual servers of each of the plurality of virtual server types so that constraints given by the usage amount and number of devices included in the input values are satisfied, while minimizing the total cost.

7. An information processing apparatus comprising:
   circuitry configured to
   receive, from a terminal device, input values indicating a service scale of a user service, the terminal device being connected to the information processing apparatus through a network and the input values including a usage amount, a number of devices, and an input site location;
   determine a data center location and an optimum number of virtual servers of each of a plurality of virtual server types for providing the user service at the data center location, so as to minimize a total cost, based on the input values included in the received service scale by referring to a stored table in which performance values and a charge of each of the plurality of virtual server types are associated with each other;
   determine a charge plan from the table and from the determined optimum number of virtual servers of each of the plurality of virtual server types;
   display information including the determined charge plan and the determined optimum number of virtual servers of each of the plurality of virtual server types; and
   build the determined optimum number of virtual servers of each of the plurality of virtual server types according to the determined charge plan, in response to a provisioning instruction received based on the displayed information.

8. An information processing method performed by a computer connectable to a terminal device through a network, the method comprising:

receiving, from a terminal device, input values indicating a service scale of a user service, the input values including a usage amount, a number of devices, and an input site location;

determining, by circuitry, a data center location and an optimum number of virtual servers of each of a plurality of virtual server types for providing the user service at the data center location, so as to minimize a total cost, based on the input values included in the received service scale, by referring to a stored table in which performance values and a charge of each of the plurality of virtual server types are associated with each other;

determining a charge plan from the table and from the determined optimum number of virtual servers of each of the plurality of virtual server types;

displaying information including the determined charge plan and the determined optimum number of virtual servers of each of the plurality of virtual server types; and building the determined optimum number of virtual servers of each of the plurality of virtual server types according to the determined charge plan, in response to a provisioning instruction received based on the displayed information.

9. The information processing method of claim 8, wherein the input values include the input site location, indicating a place of using the user service, the usage amount, and the number of devices, for each of a plurality of input sites; and wherein the step of determining the optimum number of virtual servers of each of the plurality of virtual server types for providing the user service includes identifying, as the data center location, a data center closest to the input site location, and determining the charge and the number of virtual servers of each of the plurality of virtual server types, for each of the plurality of input sites.

10. The information processing method of claim 9, further comprising:

determining whether or not a country to which the input site location belongs permits use of a virtual server built in a data center of another country; and when the determining that the country to which the input site location belongs does not permit usage of the virtual server built in the data center of another country, the determining includes identifying a data center closest to the input site location and located in a same country.

11. The information processing method of claim 8, wherein the performance values of each of the plurality of the virtual server types include a maximum usage amount and a maximum number of devices that can be connected to a virtual server of the virtual server type, and the information processing method further comprises calculating a marginal usage amount indicating a difference between the maximum usage amount of the virtual server and the usage amount included in the input values and a marginal number of devices indicating a difference between the maximum number of devices that can be connected to the virtual server and the number of devices included in the input values; and displaying information including the calculated marginal usage amount and the calculated marginal number of devices.

12. The information processing method of claim 8, further comprising installing a program for implementing the user service in the determined optimum number of virtual servers of each of the plurality of virtual server types that has been built.

\* \* \* \* \*